(12) United States Patent
Okuni et al.

(10) Patent No.: US 12,443,296 B2
(45) Date of Patent: Oct. 14, 2025

(54) TOUCH PAD

(71) Applicant: Lenovo (Singapore) Pte. Ltd., Singapore (SG)

(72) Inventors: Akihisa Okuni, Kanagawa (JP); Issei Kurosawa, Kanagawa (JP); Kazumi Nakaju, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/761,553

(22) Filed: Jul. 2, 2024

(65) Prior Publication Data
US 2025/0036218 A1 Jan. 30, 2025

(30) Foreign Application Priority Data
Jul. 27, 2023 (JP) .................................. 2023-122602

(51) Int. Cl.
*G06F 3/0354* (2013.01)
*G06F 3/044* (2006.01)

(52) U.S. Cl.
CPC .......... *G06F 3/03547* (2013.01); *G06F 3/044* (2013.01)

(58) Field of Classification Search
CPC .............................. G06F 3/03547; G06F 3/044
See application file for complete search history.

(56) References Cited

U.S. PATENT DOCUMENTS

| | | | | |
|---|---|---|---|---|
| 2009/0135145 | A1* | 5/2009 | Chen | G06F 3/016 345/173 |
| 2012/0103773 | A1* | 5/2012 | Villain | G06F 3/03547 200/344 |
| 2021/0263556 | A1 | 8/2021 | Degner et al. | |
| 2022/0066580 | A1* | 3/2022 | Lin | G06F 3/03547 |
| 2022/0108850 | A1* | 4/2022 | Lin | H01H 13/85 |
| 2022/0113819 | A1* | 4/2022 | Li | G06F 1/169 |
| 2022/0374094 | A1* | 11/2022 | Liu | G06F 3/0202 |
| 2023/0195184 | A1* | 6/2023 | Wang | G06F 1/1656 345/173 |

FOREIGN PATENT DOCUMENTS

JP 2018060306 A 4/2018

* cited by examiner

*Primary Examiner* — Hong Zhou
(74) *Attorney, Agent, or Firm* — Osha Bergman Watanabe & Burton LLP

(57) ABSTRACT

A touch pad, on which a pointing operation is performed by a hand, includes: a sensor board configured to recognize a touch position by a hand; an outer frame configured to be fixed to the sensor board; a cross-shaped inner frame configured to be disposed on an inner side of the outer frame, in which one ends of four arm portions are connected and the other ends extend toward four locations of the outer frame; a switch configured to be provided between the one end of the arm portion and the sensor board; and a shaft support portion configured to support each of the four arm portions to be capable of being inclined in a pitch direction at an intermediate portion. The other end is displaced in a lifting/lowering direction together with the sensor board, and is supported to be relatively displaceable in the other two directions.

9 Claims, 15 Drawing Sheets

TOUCH PAD

CROSS-REFERENCE TO RELATED APPLICATIONS

This application claims priority to Japanese Patent Application No. 2023-122602 filed on Jul. 27, 2023, the contents of which are hereby incorporated herein by reference in their entirety.

TECHNICAL FIELD

The present invention relates to a touch pad on which a pointing operation is performed by a hand.

BACKGROUND

For example, in a laptop type personal computer (laptop PC), a touch pad that serves as an alternative to a mouse is provided in addition to a keyboard. The touch pad is one type of pointing device that moves a cursor displayed on a display device in response to a touch operation from a fingertip. The touch pad is generally provided adjacent to the keyboard on the near side of the main body chassis upper surface.

Regarding the input device provided with such a touch pad, the present applicant has proposed, in Japanese Patent Application Laid-Open No. 2018-060306, a configuration that enables a touch operation and a pressing operation. In this configuration, a plurality of pseudo button regions are set on the touch surface of the touch pad, and it is possible to perform an input operation corresponding to each pseudo button region by performing a pressing operation on the touch pad while touching each pseudo button region. Such a touch pad includes a sensor board that detects a hand touch on an upper surface, and a switch that can be turned on and off by pushing the sensor board, and a click feeling is obtained by switching the switch.

In the electronic apparatus disclosed in Japanese Patent Application Laid-Open No. 2018-060306, a pointing stick is provided at a substantial center of the keyboard. A button region on the keyboard side in the touch pad is an operation region associated with the pointing stick.

In order to enable the pressing operation of the sensor board, a shaft, such as a hinge, may be provided along an edge adjacent to the keyboard and the sensor board may be tiltable about the shaft. However, with such a configuration, although the appropriate up-down movement width is ensured on the near side, the far side near the shaft does not move up and down much, and a good click feeling cannot be obtained, which may give the user a sense of discomfort. In particular, it is difficult to obtain a click feeling in the above-described button region on the keyboard side in the touch pad.

SUMMARY

One or more embodiments of the present invention provide a touch pad of which the entire surface is capable of moving up and down appropriately, and which provides a good click feeling.

A touch pad according to one or more embodiments of the present invention, on which a pointing operation is performed by a hand, includes: a sensor board configured to recognize a touch position by a hand; an outer frame configured to be fixed to the sensor board; a cross-shaped inner frame configured to be disposed on an inner side of the outer frame, in which one ends of four arm portions are connected and the other ends extend toward four locations of the outer frame; a switch configured to be provided between the one end of the arm portion and the sensor board; and a shaft support portion configured to support each of the four arm portions to be capable of being inclined in a pitch direction at an intermediate portion, in which the other end is displaced in a lifting/lowering direction together with the sensor board, and is supported to be relatively displaceable in the other two directions, and as the sensor board is pushed by a hand, the arm portion is displaced relative to the outer frame while the other end is pushed down, and is inclined with respect to the shaft support portion in the pitch direction, and the one end is pushed up to perform a pressing operation with respect to the switch.

According to the above-described aspect of the present invention, the entire surface is capable of moving up and down appropriately, and a good click feeling is obtained.

DETAILED DESCRIPTION

Hereinafter, embodiments of the touch pad according to the present invention will be described in detail with reference to the accompanying drawings. It should be noted that the present invention is not limited to the embodiments herein.

Figure 1:
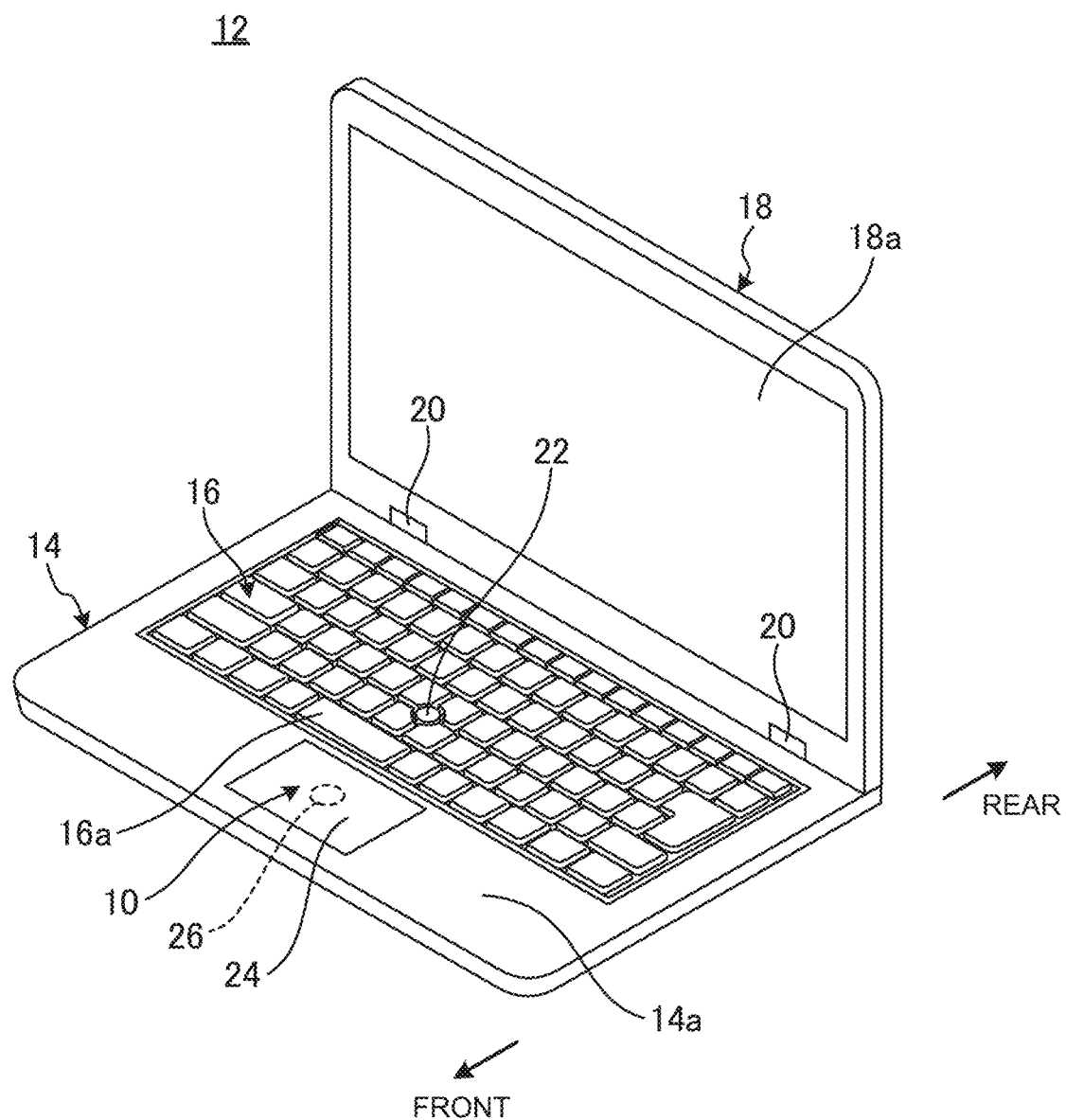
FIG. 1 is a perspective view of an electronic apparatus including a touch pad according to one or more embodiments of the present invention.

FIG. 1 is a perspective view of an electronic apparatus 12 including a touch pad 10 according to one or more embodiments of the present invention. Hereinafter, the touch pad will be described with reference to a use form in a state of being mounted on the electronic apparatus 12 shown in FIG. 1, a near side is referred to as a front side (front part), a far side is referred to as a rear side (rear part), a thickness direction of a main body chassis 14 constituting the electronic apparatus 12 is referred to as an up-down direction, and a width direction is referred to as a left-right direction.

As shown in FIG. 1, the electronic apparatus 12 is a laptop type PC including the main body chassis 14 having the touch pad 10 and a keyboard 16, and a display chassis 18 having a display 18a such as a liquid crystal display. The display chassis 18 is connected to the main body chassis 14 in an openable and closable manner by a pair of left and right hinges 20 and 20. The touch pad 10 is an integrated type of the electronic apparatus 12, but may be an external type.

A variety of electronic components such as a board, an operation processing device, a storage, a memory, and a battery (not shown) are stored inside the main body chassis 14. The touch pad and the keyboard 16 are arranged on front and rear sides on the upper surface of the main body chassis 14. A pointing stick 22 is provided at a substantial center of the keyboard 16.

The pointing stick 22 is a type of pointing device that moves a cursor displayed on the display 18a in a tilt direction. The pointing stick 22 has a small cylindrical shape and is provided at a substantial center of the keyboard 16, for example, at an intermediate position of a G key, an H key, and a B key. The pointing stick 22 mainly moves the cursor by performing a tilting operation with the index finger or the middle finger, and mainly pushes the touch pad 10 with a thumb to click to specify the point.

Next, the touch pad 10 will be described. The touch pad 10 is provided substantially at the center of the palm rest region on the near side of the keyboard 16 on the upper surface of the main body chassis 14. That is, the touch pad 10 is provided to be adjacent to front and rear sides of the keyboard 16. The center of the touch pad 10 in the left-right direction substantially coincides with the pointing stick 22. The touch pad 10 is a slightly oblong rectangle, and the front and rear width occupies substantially the entire width of the palm rest region. A size of the touch pad 10 in a plan view is, for example, about 12 cm×7 cm.

The touch pad 10 is a pointing device that performs a pointing operation of moving a cursor by a hand (including a fingertip, a pen tip, and the like), and the internal switch 26 is switched by pushing the sensor board 24 on the surface to obtain a click feeling. The sensor board 24 can recognize a touch position of a hand. In the touch pad 10, processing such as a so-called right click and left click can be performed depending on the position of the hand when the sensor board 24 is pushed down. In addition, the touch pad 10 can correspond to each operation such as a tap, a double tap, a two-finger tap, and a pinch by software processing.

Figure 2:
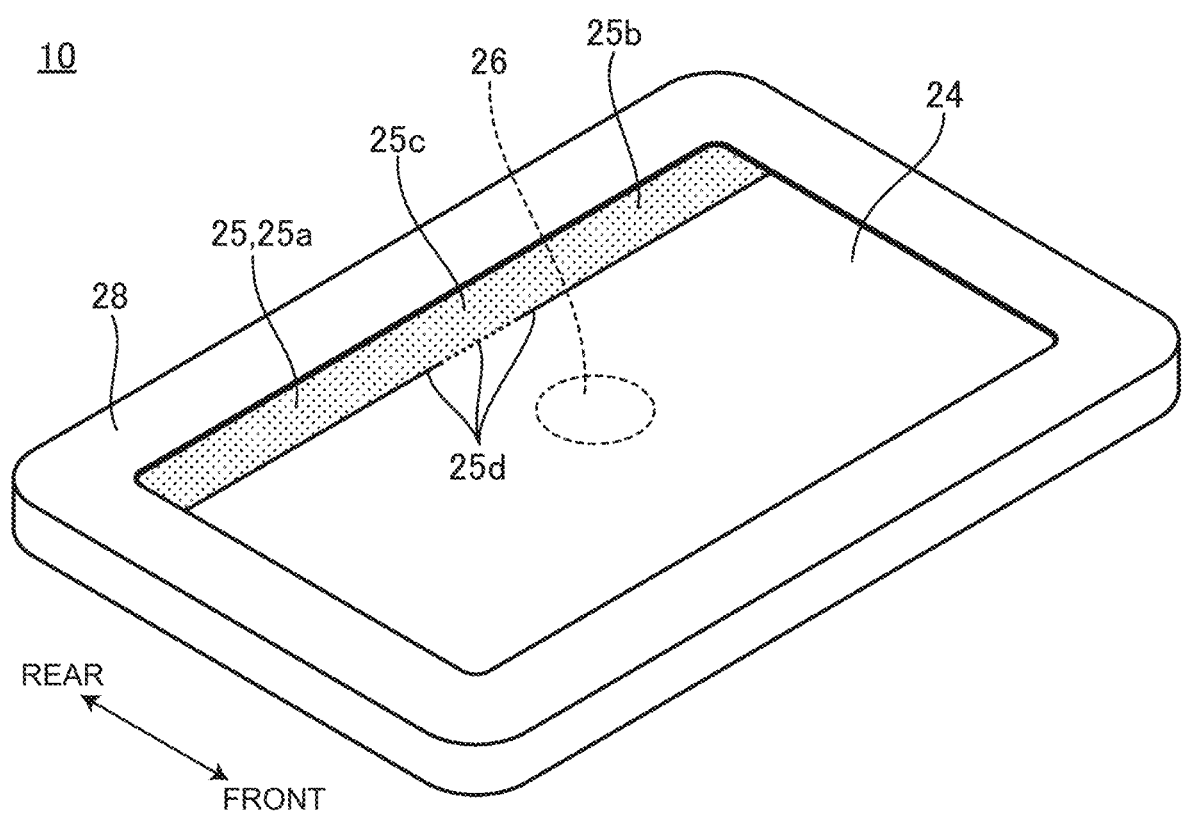
FIG. 2 is a perspective view of the touch pad.
Figure 3:
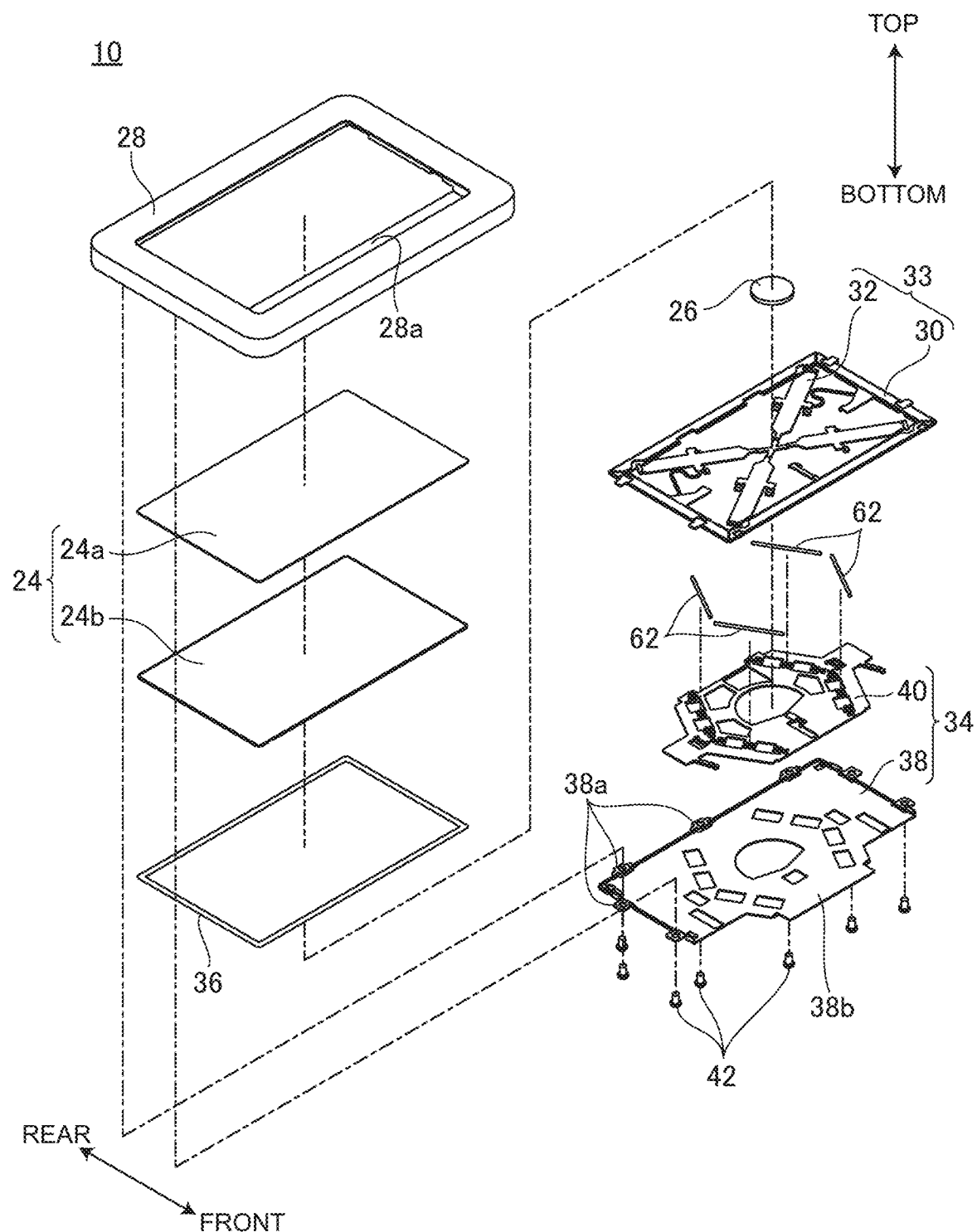
FIG. 3 is an exploded perspective view of the touch pad.

FIG. 2 is a perspective view of the touch pad 10. FIG. 3 is an exploded perspective view of the touch pad 10. The touch pad 10 includes a frame body 28, the sensor board 24, the switch 26, an outer frame 30, an inner frame 32, and a base plate (base) 34. Although the frame body 28 is a member that constitutes the outer shell of the touch pad 10, an upper surface plate 14a (refer to FIG. 1) of the main body chassis 14 may also serve as the frame body 28. The outer frame 30 is a rectangular frame-like member having the same outer dimensions as the sensor board 24, and is fixed to the sensor board 24 by a sufficiently thin adhesive tape 36. The outer frame 30 is not limited to the frame shape, and may have, for example, a partially open corner C-shape. Fixing means of the outer frame 30 and the sensor board 24 may be an engagement structure or the like. The adhesive tape 36 is a component referred to as, for example, a stretch release tape, a stretch double-sided tape, or a stretchable tape, which has a characteristic of being tensile and releasable. A glass 24a and a circuit board 24b, and a metal plate 38 and a resin plate 40, which will be described later, may be fixed with the same adhesive tape.

The sensor board 24 has a size that fits into the opening of the frame body 28, and has a laminated structure of the glass 24a having a sensing function such as a capacitive type and the circuit board 24b. The switch 26 is a thin and small switch, and is provided between the central portion of the inner frame 32 and the sensor board 24. The switch 26 may be mounted on the circuit board 24b. The switch 26 is turned on and off by being pressed, and an appropriate click feeling is obtained. The switch 26 in the present example is of a normal open type.

A band-shaped region along the rear edge of the upper surface of the sensor board 24 close to the keyboard 16 is set as a button region 25. In FIG. 2, the button region is shown by dots. The button region 25 is set to have a narrow front and rear width to the extent that the finger pressing operation is possible. The button region 25 is assigned to an operation associated with the pointing stick 22, and is composed of a left click portion 25a and a right click portion 25b, which have a slightly wider width on the left and right sides, and a scroll portion 25c, which has a narrow width at the center. The scroll portion 25c is for scrolling the Web page or the document in any direction. The button region 25 is mainly operated with the thumb in combination with the pointing stick 22, and is divided from other regions by a mark 25d such as a straight line or a dot.

The base plate 34 has a laminated structure of the metal plate 38 and the resin plate 40, and both are fixed. A plurality of screw seats 38a are formed around the metal plate 38, and are fixed to the frame body 28 with screws 42. A short tongue piece 38b having a width of about ⅓ of the full left and right width is provided on the front side of the metal plate 38. Although the tongue piece 38b is configured to be placed on the upper surface of a shelf portion 28a formed on the frame body 28, a screwing configuration may be adopted in which the tongue piece 38b is screwed in the same manner as the other three sides, depending on the layout requirements or the like. The base plate 34 will be further described in detail later.

Figure 4:
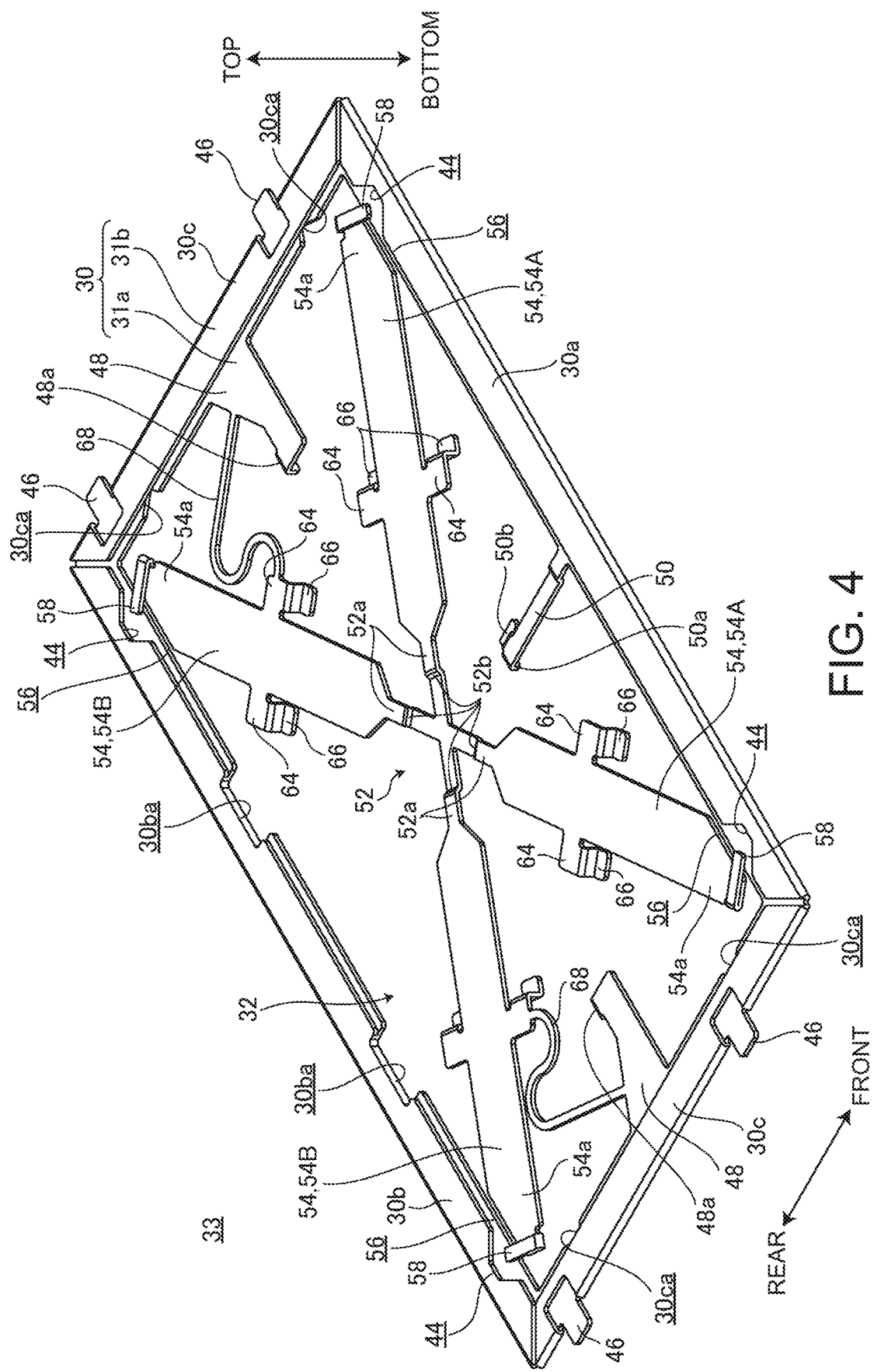
FIG. 4 is a perspective view of an outer frame and an inner frame.
Figure 5:
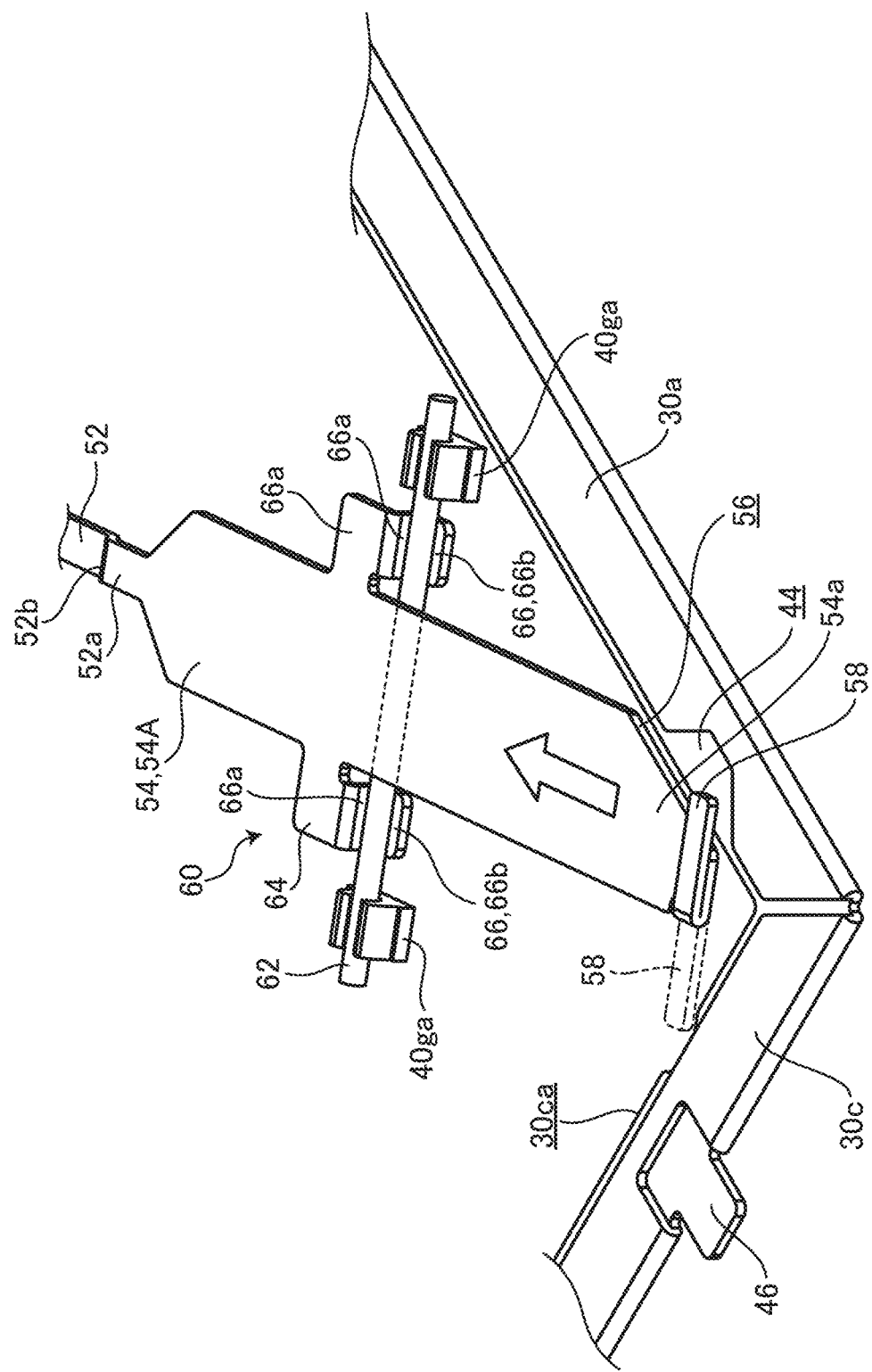
FIG. 5 is an enlarged perspective view of a corner portion of the outer frame.
Figure 6:
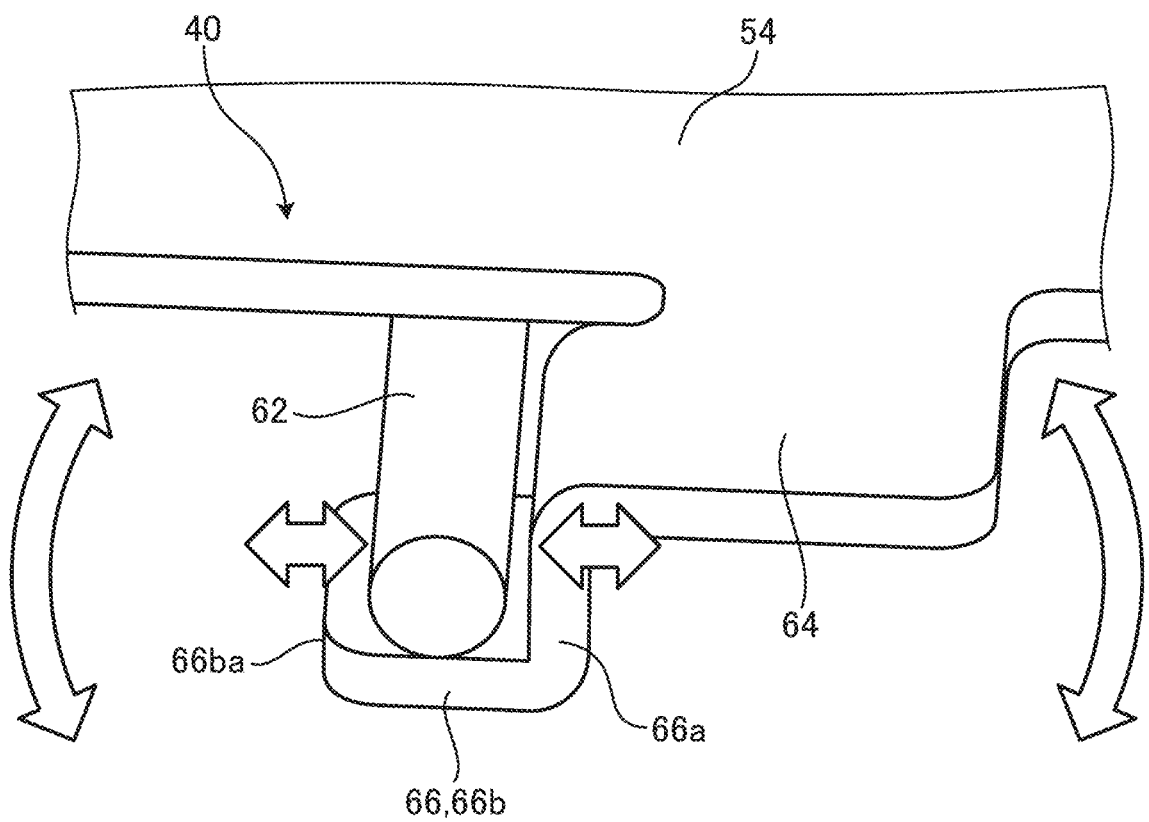
FIG. 6 is a perspective view of an intermediate portion of an arm portion.

FIG. 4 is a perspective view of the outer frame 30 and the inner frame 32. The outer frame 30 and the inner frame 32 are also collectively referred to as a frame unit 33. FIG. 5 is an enlarged perspective view of a corner portion of the outer frame 30. FIG. 6 is a perspective view of an intermediate portion of an arm portion 54.

The outer frame 30 and the inner frame 32 are formed by press working, laser working, bending, or the like of a single metal plate such as a stainless material, and are connected to each other by an elastic connecting portion 68, which will be described later, to be integrated with each other, and thus the outer frame 30 and the inner frame 32 are easy to handle during assembly and disassembly.

The outer frame 30 has a slightly oblong frame shape as described above, and has a vertical-horizontal ratio of about 3:5 in the present example. The outer frame 30 includes a front frame 30a, a rear frame 30b, and left and right vertical frames 30c. Two notches 30ba are formed in the rear frame 30b. The notch 30ba is provided to avoid interference with a shaft 62, which will be described later.

The four frames each have a two-layer structure consisting of a lower layer plate 31a and an upper layer plate 31b in which a material is folded along the edge, and thus have high strength. The upper layer plate 31b also serves as a spacer for ensuring an upper gap 70 (refer to FIG. 12) for allowing the arm portion 54, which will be described later, to be inclined. The upper layer plate 31b has substantially the same shape as the lower layer plate 31a, but is slightly narrower in width than the lower layer plate 31a, and each end portion is cut at 45 degrees. In the present example, the width of each frame is about 6 mm at a part of the lower layer plate 31a. A part of the upper layer plate 31b in the vicinity of the left and right ends of the front frame 30a and the rear frame 30b is cut out. This part forms a narrow slide fitting portion 44 (refer to FIG. 12) between the upper surface of the lower layer plate 31a and the lower surface of the sensor board 24. Although the slide fitting portion 44 in this case is a groove that does not penetrate laterally, the slide fitting portion 44 may also penetrate through the groove.

A small protrusion 46 is formed in a state of being left without being folded and protruding to the side in the vicinity of the front and rear ends of each vertical frame 30c. A small triangular notch 30ca is formed on the inner side of the frame in the vicinity of the small protrusion 46 in each vertical frame 30c. The notch 30ca is a region for ensuring a side protruding portion 58, which will be described later. A protrusion 48 that extends from the intermediate portion of each vertical frame 30c toward the frame center is provided. The length of the protrusion 48 of the present example is about ⅕ of the front frame 30a and the rear frame 30b. The protrusion 48 has a substantially triangular shape with a thick root portion and has appropriate strength. A distal end rear portion of the protrusion 48 forms a first positioning piece 48a that is bent downward. The first positioning piece 48a has an appropriate width in the left-right direction.

A plate spring 50 that extends from an intermediate portion of the front frame 30a toward the frame center is provided. A length of the plate spring 50 of the present example is about ⅓ of the length of the vertical frame 30c. The plate spring 50 is thin and appropriately long, and thus the plate spring 50 is elastic. The plate spring 50 has a small step to be shifted downward at a position close to the front frame 30a. A small bent portion 50a is provided at the distal end of the plate spring 50, and a second positioning piece 50b is provided on the distal end portion side. The bent portion 50a and the second positioning piece 50b each protrude downward from the base plate 34. The second positioning piece 50b has an appropriate width in the front-rear direction, and the root portion is slightly thinned.

The inner frame 32 is disposed on the inner side of the outer frame 30, and is a cross-shaped member having four arm portions 54 that extend from a central portion 52 toward four symmetrical positions (four corners in this case) in the outer frame 30. However, the arm portions 54 do not have to be symmetrical and the number thereof does not have to be four. That is, the mechanism is established as long as the arm portion 54 extends radially from the switch 26 as the center point toward the outer frame 30. In the present example, the width of each arm portion 54 is about 8 mm. The central portion 52 is a part where the arm portion 54 becomes thinner and four extension portions (one end) 52a intersect, and the arm portion 54 slightly protrudes downward due to a step portion 52b in the middle. A part where the arm portion 54 is connected to the extension portion 52a is tapered in a triangular shape. The extension portion 52a is also regarded as a part of the arm portion 54. That is, the inner frame 32 has a configuration in which the extension portions 52a, which are one ends of the four arm portions 54, are connected to each other and the other end portions 54a extend toward the four places in the outer frame 30.

The switch 26 (refer to FIG. 3) is disposed in a range of the central portion 52 on the inner side of the four step portions 52b. Since the extension portion 52a is thin, the extension portion 52a can be elastically deformed. Since the extension portion 52a can also be regarded as a part of the arm portion 54, the arm portion 54 is configured to be elastically bendable between the central portion 52 that presses the switch 26 and the other parts. In addition, the arm portion 54 has the step portion 52b between the central portion 52 that presses the switch 26 and the other parts.

The end portion (the other end) 54a of the arm portion 54 is cut obliquely along the edges of the front frame 30a and the rear frame 30b, and a narrow gap 56 is formed between the front frame 30a and the rear frame 30b. The end portion 54a of the arm portion 54 is provided with the side protruding portion 58 that slightly protrudes in the front-rear direction and fits into the slide fitting portion 44. The side protruding portion 58 is formed by folding the part of the arm portion 54 that protrudes from the end portion 54a into the region of the notch 30ca as shown by the virtual line in FIG. 5 to the opposite side in a state of being cut out from the metal plate. The side protruding portion 58 is formed by folding the side of the sensor board 24, that is, the upper side, and is located at the same height as the upper layer plate 31b, and is fitted into the slide fitting portion 44.

The arm portion 54 is relatively displaceable with respect to the outer frame 30 in the front-rear direction and the left-right direction by the side protruding portion 58 sliding in the slide fitting portion 44. In addition, the upper and lower width of the slide fitting portion 44 is strictly wider than the side protruding portion 58 by the thickness of the adhesive tape 36 (refer to FIG. 12). However, the adhesive tape 36 is sufficiently thin, and thus there is no substantial upper and lower gaps, and the end portion 54a of the arm portion 54 is restricted to be displaced in the lifting/lowering direction (up-down direction) together with the sensor board 24, and is supported to be relatively displaceable in the other direction along the surface of the sensor board 24. Although the slide fitting portion 44 is formed by the outer frame 30 and the sensor board 24, the slide fitting portion 44 may be formed by either one (including a substantially integral element).

As shown in FIGS. 5 and 6, substantially intermediate portions of the four arm portions 54 are pivotally supported by a shaft support portion 60 on the base plate 34 to be capable of being inclined in the pitch direction. Each of the four shaft support portions 60 includes a thin shaft 62 supported by a fastening piece 40ga of the base plate 34 and oriented substantially orthogonal to the extension direction of the arm portion 54, a pair of shoulder portions 64 that protrude on both sides of the arm portion 54, and a shaft support piece 66 that protrudes short from each shoulder portion 64 along the extension direction of the arm portion 54 and is bent in two stages to form a stepped shape. The shoulder portion 64 and the shaft support piece 66 are integral with the arm portion 54. The shaft support piece 66 includes a vertical plate 66a extending downward from the shoulder portion 64 and a horizontal plate 66b connected to a lower end of the vertical plate 66a and protruding along the extension direction of the arm portion 54. The shaft 62 is disposed between the lower surface of the arm portion 54 and the upper surface of the horizontal plate 66b with substantially no gap.

In a reference state where the sensor board 24 is not pushed by a hand, the shaft 62 is disposed at a substantial center of the horizontal plate 66b, and there is a certain distance between the shaft 62 and the vertical plate 66a and up to a distal end 66ba of the horizontal plate 66b. In other words, although the arm portion 54 is capable of moving in the pitch direction with respect to the shaft 62 by the shaft support portion 60 and a bearing portion 40g (refer to the arcuate arrow in FIG. 6), the arm portion 54 is not restricted in the extension direction and is slidable (refer to the horizontal arrow in FIG. 6).

Returning to FIG. 4, in the front two of the four arm portions 54 (denoted by reference numeral 54A in FIG. 4), the horizontal plate 66b of the shaft support piece 66 is oriented toward the corner portion of the outer frame 30. In the rear two of the four arm portions 54 (denoted by reference numeral 54B in FIG. 4), the horizontal plate 66b of the shaft support piece 66 is oriented toward the center portion of the outer frame 30. In other words, the four sets of the shaft support pieces 66 are opened in the same predetermined direction such that the shaft 62 can be inserted and extracted.

The front two of the two shoulder portions 64 in each arm portion 54B are connected to the protrusion 48 by the elastic connecting portion 68, respectively. The elastic connecting portion 68 has an appropriately long overall length, is thin, has a plurality of curved portions, is soft, and does not hinder relative movement between the outer frame 30 and the inner frame 32. The elastic connecting portion 68 in this case has an S shape, but may have a W shape, an Q shape, or the like. The elastic connecting portion 68 is located on the same plane as the arm portion 54B and the protrusion 48, and can be formed by a punching process from the same metal material. In particular, the shoulder portion 64 to which one of the elastic connecting portions 68 is connected is on the same plane as the arm portion 54 and is appropriate as a connection destination, and is also an integral part with the shaft support piece 66 that supports the shaft 62. Therefore, rotation of the arm portion 54 around the shaft 62 is not hindered.

The outer frame 30 and the inner frame 32 are connected to each other by the elastic connecting portion 68, and thus the outer frame 30 and the inner frame 32 are easy to handle. In addition, the elastic connecting portion 68 has a positional relationship action between the outer frame 30 and the inner frame 32. However, the inner frame 32 may be separate from the outer frame 30 as long as there is some positioning means. Even in a case where the inner frame 32 is separate from the outer frame 30, the side protruding portion 58 is fitted into the slide fitting portion 44, and thus the inner frame 32 does not escape.

Figure 7:
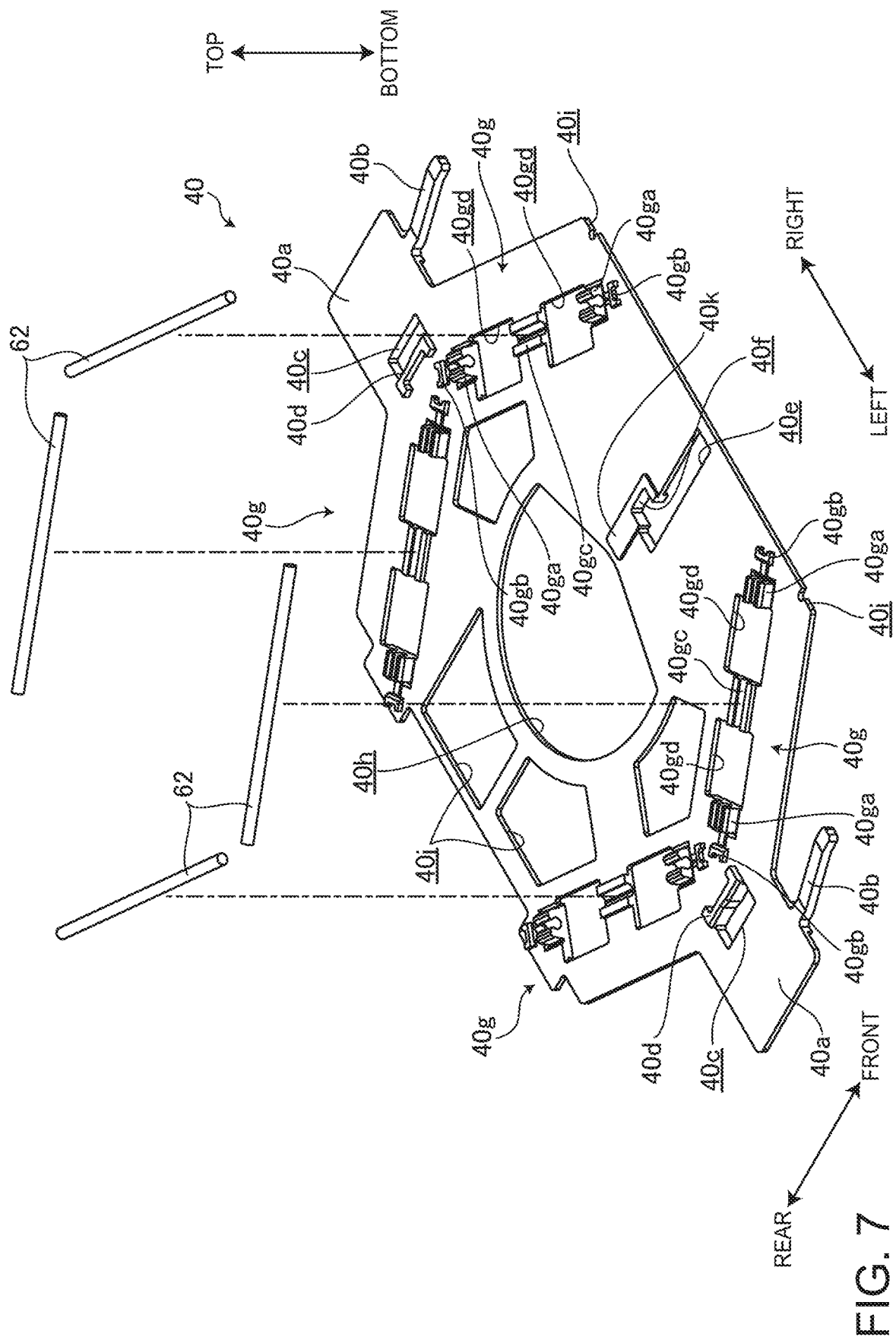
FIG. 7 is a perspective view of a resin plate.
Figure 8:
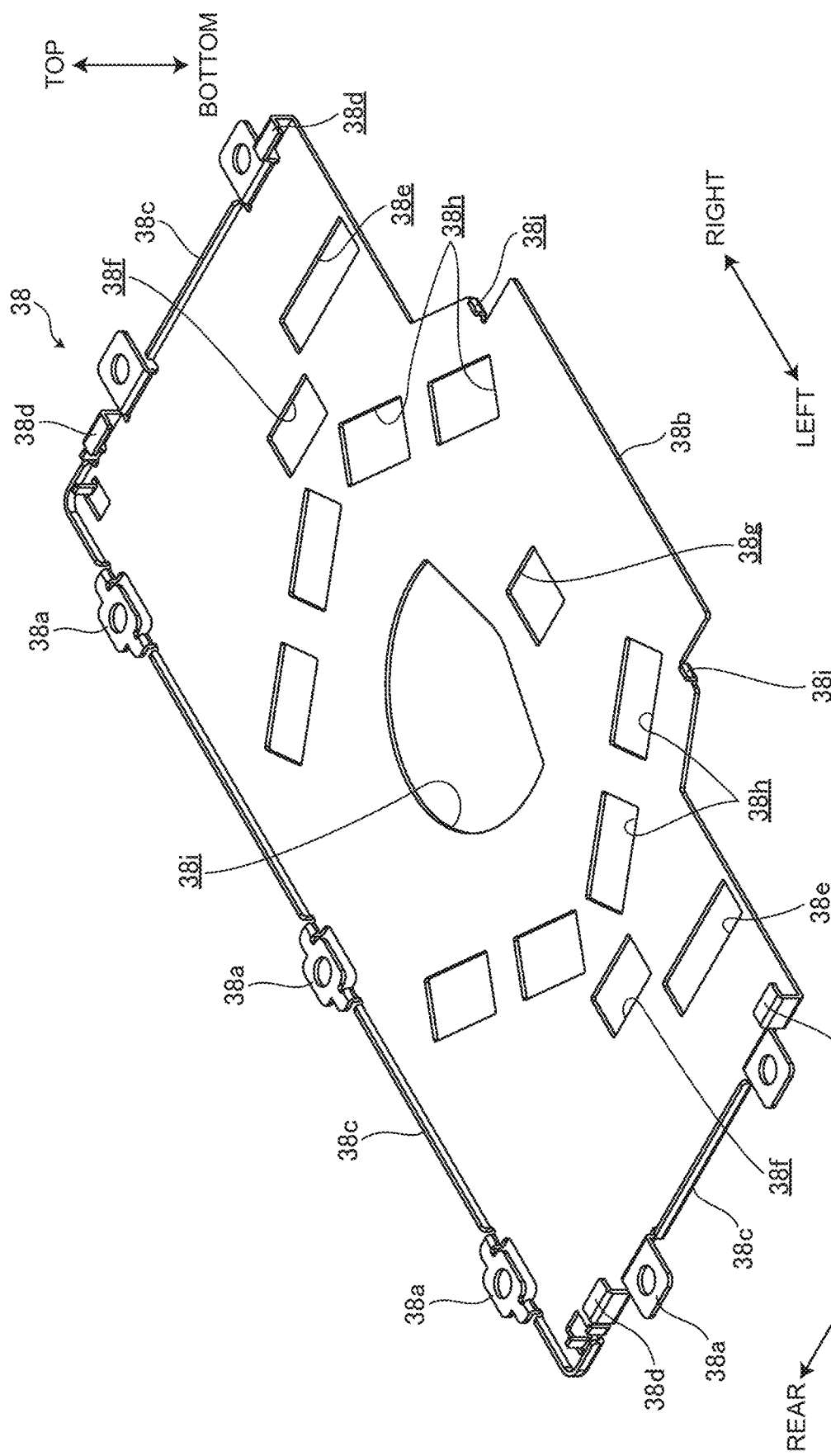
FIG. 8 is a perspective view of a metal plate.
Figure 9:
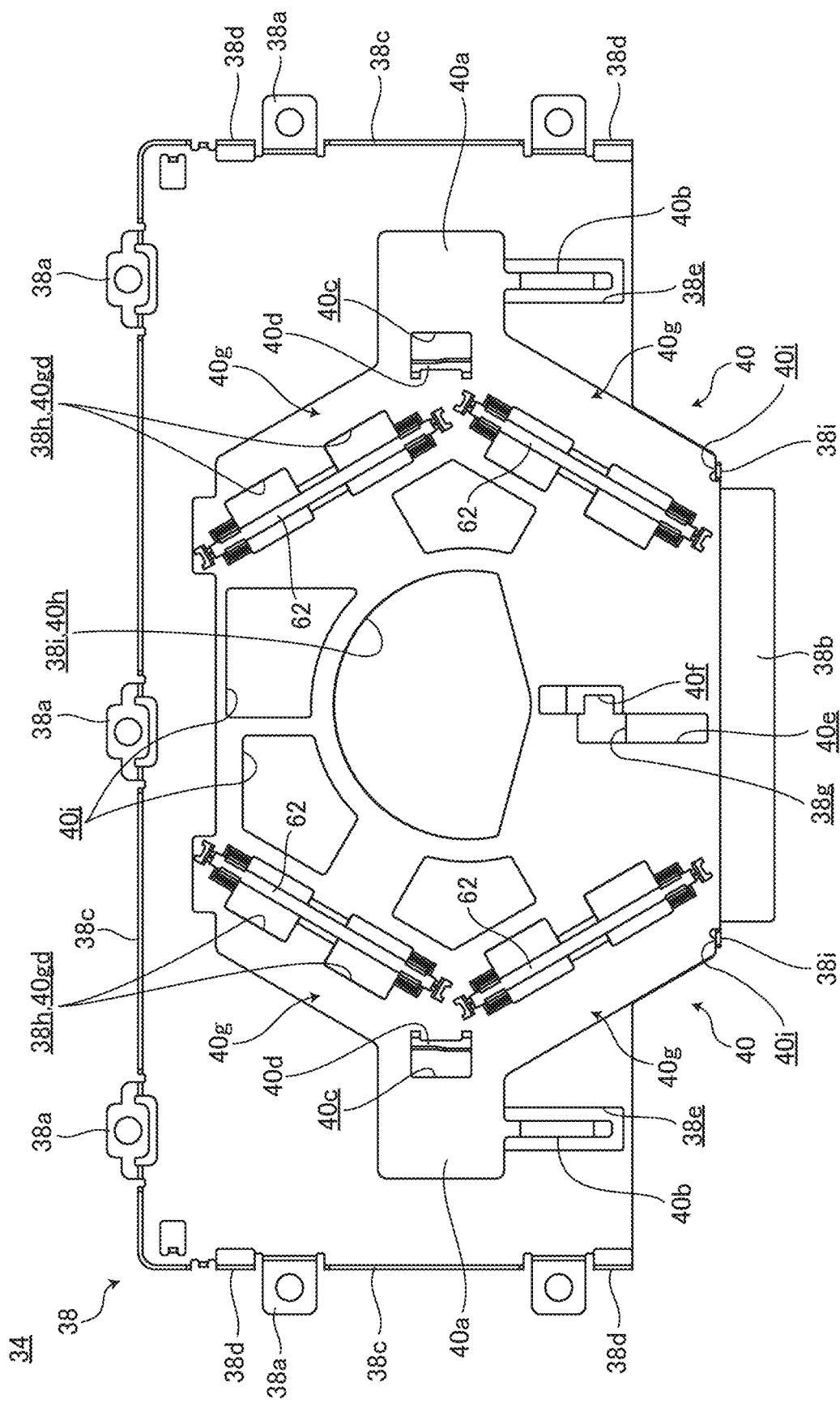
FIG. 9 is a plan view of a base plate in which the metal plate and the resin plate are laminated and fixed.
Figure 10:
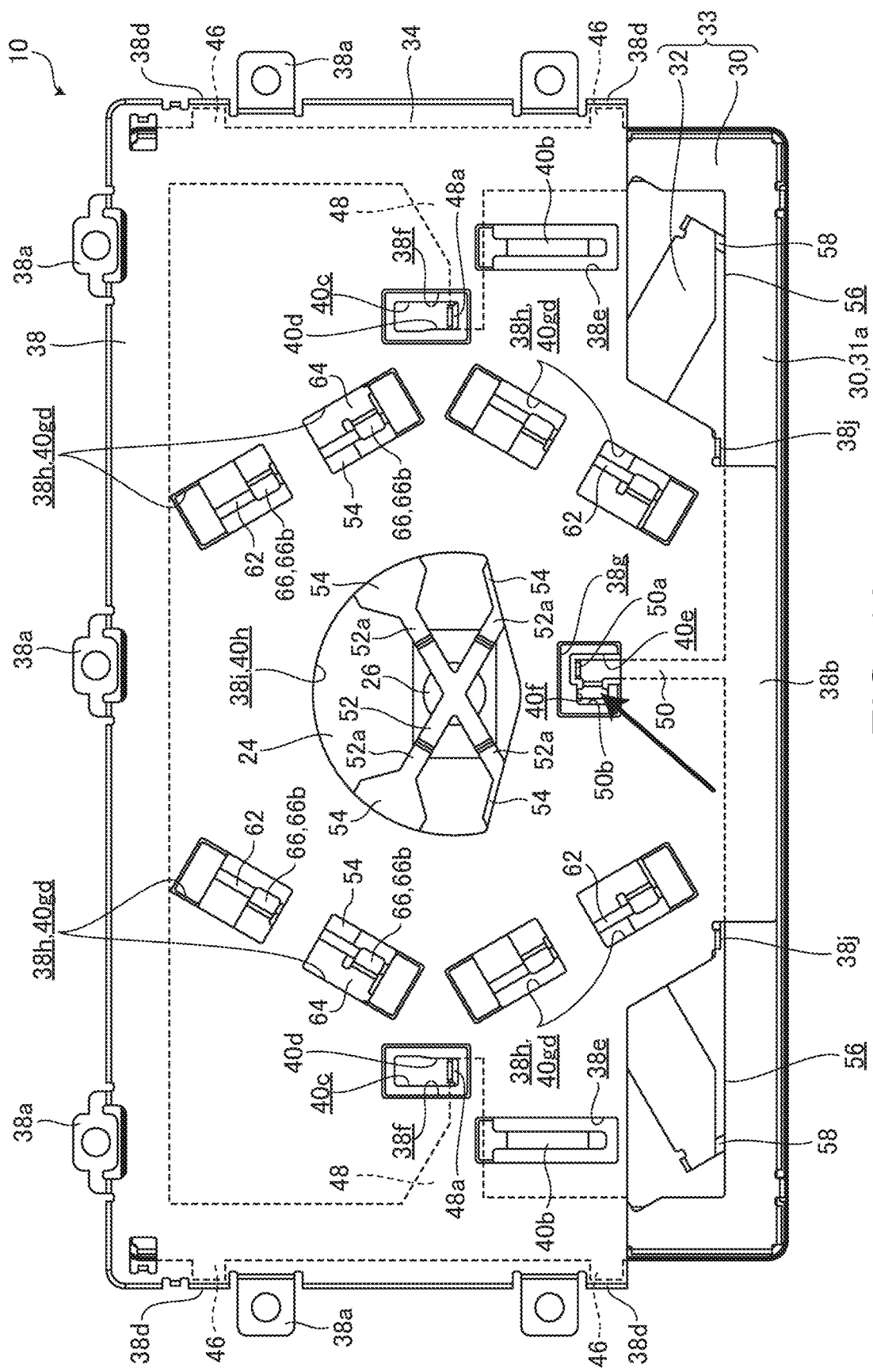
FIG. 10 is a bottom view of the touch pad in a state of being removed from a frame body.
Figure 11:
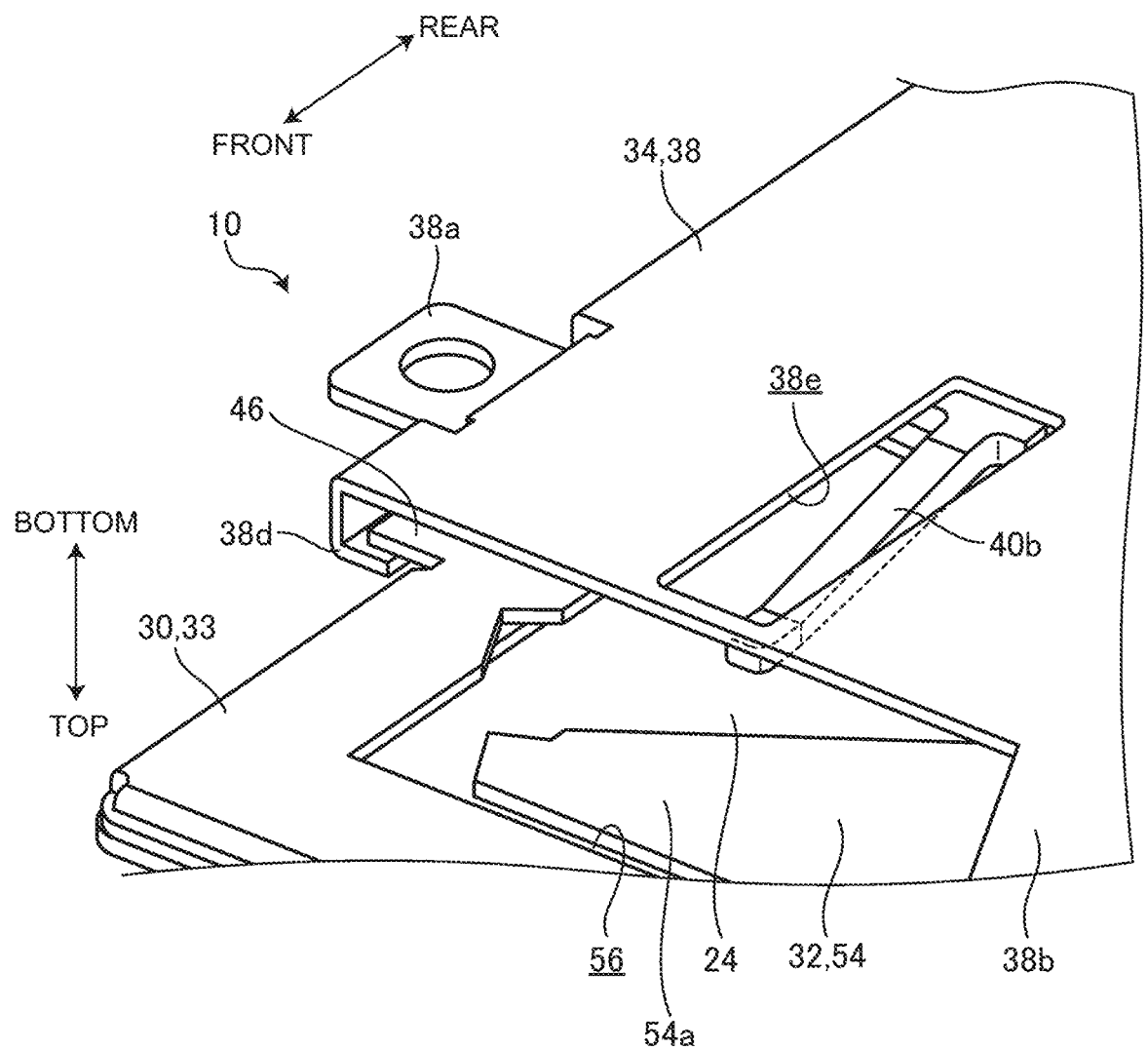
FIG. 11 is an enlarged perspective view of the corner portion of the touch pad in a state of being removed from the frame body when viewed from a lower surface.

FIG. 7 is a perspective view of the resin plate 40. FIG. 8 is a perspective view of the metal plate 38. FIG. 9 is a plan view of the base plate 34 in which the metal plate 38 and the resin plate 40 are laminated and fixed. FIG. 10 is a bottom view of the touch pad 10 in a state of being removed from the frame body 28. FIG. 11 is an enlarged perspective view of the corner portion of the touch pad 10 in a state of being removed from the frame body 28 when viewed from a lower surface.

The resin plate 40 is a functional portion of the base plate 34 made of resin to avoid so-called metal touch or the like, and has a slightly horizontally elongated hexagonal shape with rectangular end portions 40a on the left and right sides. The resin plate 40 is, for example, an ABS resin. A thin resin plate spring 40b that is slightly inclined upward toward the front protrudes from the rectangular end portion 40a. The distal end of the resin plate spring 40b is a horizontal plane, and is elastically biased upward in the vicinity of the front end of the sensor board 24 on the left and right sides (refer to FIG. 11).

At the root portion of each rectangular end portion 40a, a first positioning hole (first positioning portion) 40c and a small positioning wall (first positioning portion) 40d erected on the center side of the resin plate 40 when viewed from the first positioning hole 40c are provided. The above-described first positioning piece 48a (refer to FIG. 4) is inserted into the first positioning hole 40c and abuts against the positioning wall 40d. As a result, the frame unit 33 is positioned in the horizontal direction. As will be described later, the frame unit 33 is disassemblable by sliding forward and rearward with respect to the base plate 34. The first positioning hole 40c is a hole that is slightly longer in the front-rear direction and thus the frame unit 33 and the base plate 34 can relatively move forward and rearward. The positioning wall 40d is slightly inclined along the front-rear direction, and abuts against the first positioning piece 48a in a state after the assembly without a gap, a slight gap is generated during the disassembly, and thus the attachment and detachment are facilitated.

An escape hole 40e slightly longer in the front-rear direction is formed in the front side intermediate portion of the resin plate 40. The escape hole 40e is a hole for avoiding interference with the plate spring 50. The second positioning hole (second positioning portion) 40f that is continuous from the central side end portion of the resin plate 40 in a direction toward the right side is formed when viewed from the escape hole 40e. The above-described second positioning piece 50b (refer to FIG. 4) is inserted into and engaged with the second positioning hole 40f. The front and rear widths of the second positioning piece 50b and the second positioning hole 40f are equal to each other. Therefore, the frame unit 33 is positioned in the front-rear direction. The periphery of the second positioning hole 40f is reinforced by a thick wall portion 40k. The thick wall portion 40k is provided to the vicinity of an escape hole 40h rearward.

The resin plate 40 is provided with bearing portions 40g along four left and right sides forming an oblong hexagon at the center. The bearing portion 40g supports the shaft 62, and includes a pair of fastening pieces 40ga into which both end vicinity of the shaft 62 is fitted, a stopper protrusion 40gb that pushes the shaft 62 at both ends, and a V-block 40gc that supports the shaft 62 from a lower surface at a central portion. The fastening piece 40ga has a C-shaped cross section with an upward opening, and a pair of arcuate portions sandwiches and supports both side surfaces of the shaft 62. An escape hole 40gd is formed between each fastening piece 40ga and the V-block 40gc. The escape hole 40gd is provided to avoid interference with the shaft support piece 66 (refer to FIG. 5).

The fan-shaped escape hole 40h for avoiding interference when the central portion 52 of the inner frame 32 is lowered is formed in a substantially central portion of the resin plate 40. Small notches 40i, which are positioned by the metal plate 38, are formed at both ends of the front edge of the resin plate 40. A plurality of thin wall holes 40j are further formed in the resin plate 40.

As described above, the metal plate 38 is provided with the plurality of screw seats 38a and the tongue pieces 38b. The metal plate 38 is further formed with low bent walls 38c along the rear edge and the vertical edges on the left and right, and thus has high strength. Small stop pieces 38d are provided in the vicinity of the front and rear ends of the left and right vertical edges of the metal plate 38. The stop piece 38d has a shape in which a part of the plate is folded into an angular U-shape and the center side of the resin plate 40 is opened. The sensor board 24 and the frame unit 33 are prevented from escaping upward by fitting the small protrusion 46 (refer to FIG. 4) of the outer frame 30 into the opening of the stop piece 38d.

Escape holes 38e for avoiding interference in a case where the resin plate spring 40b is displaced are formed in the metal plate 38. The metal plate 38 is formed with escape holes 38f for avoiding interference with the first positioning piece 48a that protrudes downward penetrating through the first positioning hole 40c. The metal plate 38 is formed with escape holes 38g for avoiding interference with the second positioning piece 50b that protrudes downward penetrating through the second positioning hole 40f. The second positioning piece 50b can be pressed by the tool through the escape hole 38g (refer to the arrow in FIG. 10). The metal plate 38 is formed with escape holes 38h and escape holes 38i having the same shape and the same action at positions corresponding to the escape hole 40h and the escape holes 40gd in the resin plate 40. Small bent protrusions 38j directed upward are provided on the metal plate 38 on both sides of the tongue piece 38b. The bent protrusion 38j engages with the notch 40i to position the resin plate 40.

Figure 12:
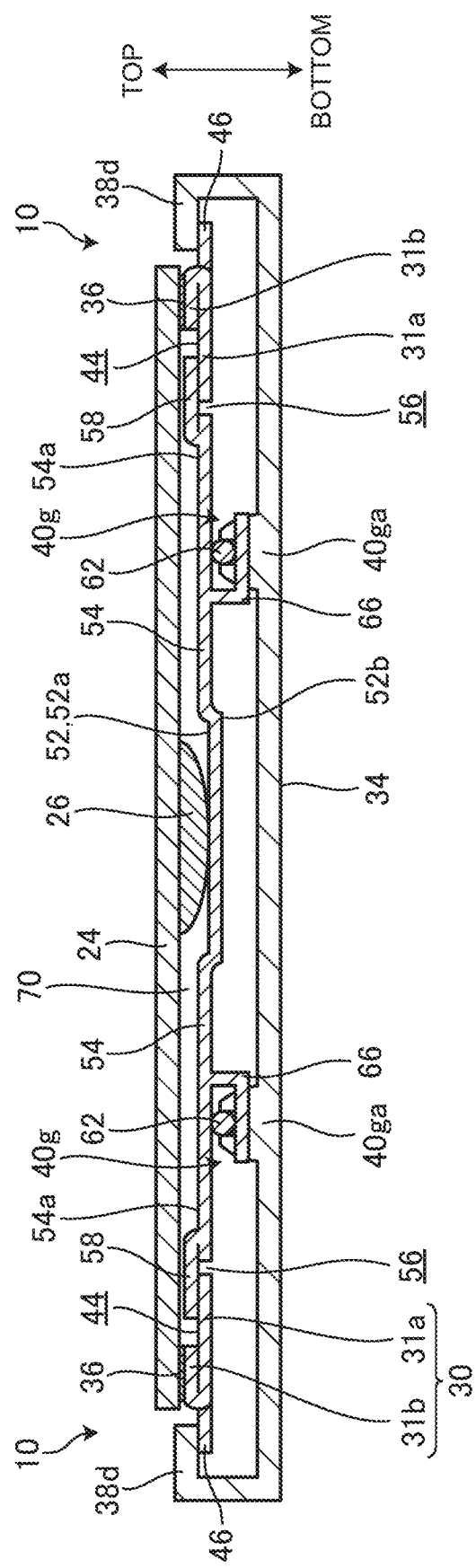
FIG. 12 is a schematic cross-sectional view of the touch pad.
Figure 13:
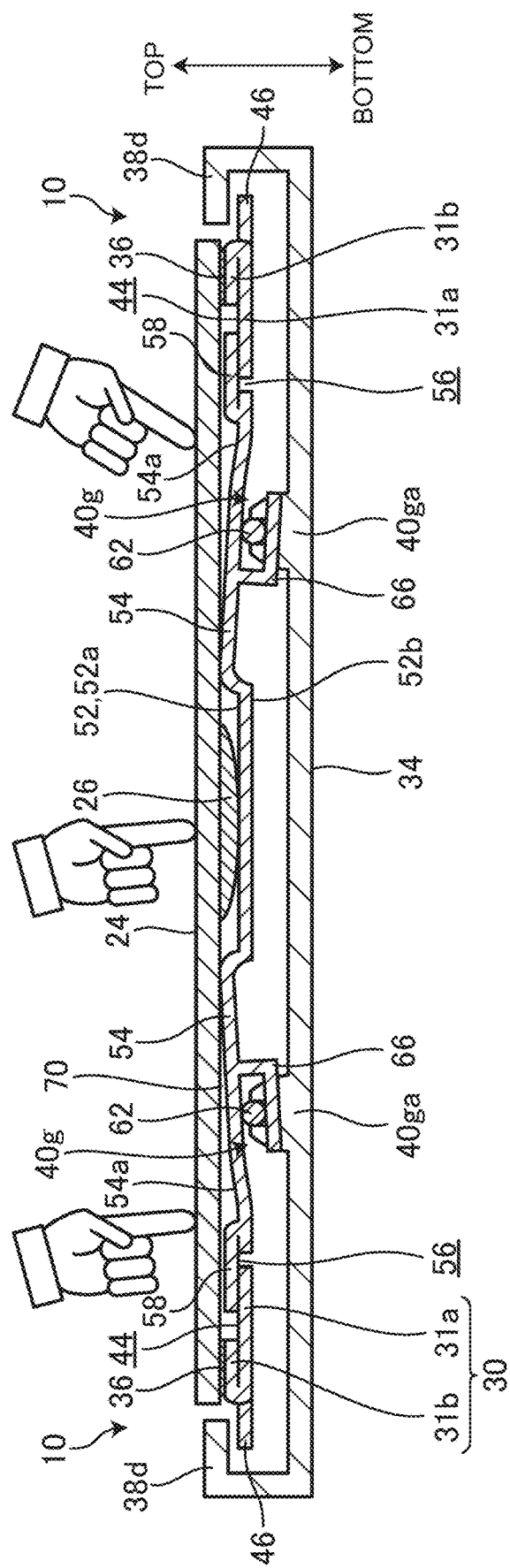
FIG. 13 is a schematic cross-sectional view of the touch pad in a state where a sensor board is pushed.

FIG. 12 is a schematic cross-sectional view of the touch pad 10. FIG. 13 is a schematic cross-sectional view of the touch pad 10 in a state where the sensor board 24 is pushed.

As shown in FIG. 12, the upper layer plate 31b serves as a spacer to form a narrow gap 70 between the arm portion 54 and the sensor board 24. The central portion 52 slightly protrudes downward due to the step portion 52b, and the switch 26 is substantially in contact with the central portion 52. In this state, the switch 26 is not pressed with a pressing force for switching the contact state. The side protruding portion 58 is fitted into the slide fitting portion 44, and the height of the end portion 54a of the arm portion 54 is restricted. Therefore, the arm portion 54 is kept horizontal without being affected by the gravity or the vibration. Since the end portion 54a of the arm portion 54 is not inadvertently lowered, the central portion 52 on the opposite side sandwiching the shaft 62 is also maintained at an appropriate height, and the switch 26 is maintained in the off state.

As shown in FIG. 13, the sensor board 24 is slightly lowered in a case where any location on the upper surface is pressed by a hand. Then, the slide fitting portion 44 formed at the end of the sensor board 24 together with the outer frame 30 is also lowered, and the side protruding portion 58 inserted into the inside thereof is also lowered. The end portion 54a of the arm portion 54 may be configured to be lowered as the sensor board 24 is pushed by a hand, and for example, an element integrated with the sensor board 24 may push the location other than the side protruding portion 58 from above, or an element integrated with the outer frame 30 may pull from below.

Since the intermediate portion of the arm portion 54 is pivotally supported by the bearing portion 40g, when the end portion 54a is lowered, the arm portion 54 is inclined with respect to the bearing portion 40g in the pitch direction, and the central portion 52 is pushed up to perform the pressing operation with respect to the switch 26 and turn on the switch 26. The sensor board 24 has an entire surface including the button region 25 that is capable of moving up and down appropriately, and the user can feel a click feeling accompanying the switching of the contact state of the switch 26 by pressing any location.

It should be noted that, at this time, as each arm portion 54 is tilted and the central portion 52 is lifted, the other parts are slightly pulled toward the central portion 52 (refer to the arrow in FIG. 5). However, the end portion 54a of the arm portion 54 allows the relative movement with respect to the outer frame 30 in the front-rear direction and the left-right direction, and the tension is hardly generated in the arm portion 54 because the side protruding portion 58 is displaced while sliding in the slide fitting portion 44, and thus the inclination of the arm portion 54 is not inhibited.

Similarly, the intermediate portion of each arm portion 54 is also slightly pulled toward the central portion 52. However, as described above, the arm portion 54 is slidably pivotally supported because the arm portion 54 is not restricted in the extension direction, and the displacement of the arm portion 54 is not inhibited.

As described above, since each arm portion 54 is configured to be slidable with respect to the outer frame 30 or the base plate 34 at the end portion 54a and the intermediate portion, no excessive pulling force is generated in association with the inclination, it is also possible to set the length to a certain length, and the touch pad 10 can be made larger. However, in a case where it is assumed that the touch pad 10 is small and the slide amount of the end portion 54a and the intermediate portion of the arm portion 54 is sufficiently small, one or both of the slide mechanisms may be omitted.

Further, each arm portion 54 is slightly elastically deformed at the end portion 54a and the central portion 52. In particular, the four extension portions 52a (refer to FIG. 4) constituting the central portion 52 are thin and easily elastically deformed, and even in a case where the other arm portions 54 are inclined, the central portion 52 is maintained substantially horizontally without being rounded, and the switch 26 can be correctly pressed by the pressing operation.

Furthermore, the inner frame 32 is disposed on the inner side of the outer frame 30 via the narrow gap 56, and even when the inner frame 32 were to rotate in a horizontal plane due to an external force or the like, the two abut against each other at any of the gaps 56, and excessive rotational deviation can be prevented.

When the pressing of the sensor board 24 by the hand is released, the arm portion 54 is restored horizontally by the elastic restoring force, the sensor board 24 is also restored to the original height, and the switch 26 returns to the off state.

In the above-described inner frame 32, the four arm portions 54 cross in an X shape, but may also be in a cross shape. The four arm portions 54 are supported to be slidable at the four corners of the outer frame 30, but may be supported at the intermediate portion of each of the four frame materials. The inner frame 32 is composed of four arm portions 54, may be well-balanced from the viewpoint of the structure and the pressing operation of the switch 26, but depending on reasons such as space constraints, one to three arm portions may be provided.

Next, the disassembly and assembly of the touch pad 10 will be described. The touch pad 10 can be disassembled into a frame unit 33 and a base plate 34 for convenience of maintenance or the like.

As described above, in a state where the touch pad 10 is assembled, the base plate 34 and the frame unit 33 are fixed without being displaced in the left-right direction and the front-rear direction. That is, as shown in FIG. 10, with respect to the left-right direction, a pair of first positioning pieces 48a that are appropriately separated from each other in the left-right direction are inserted into the first positioning hole 40c and abut against the positioning wall 40d on the side facing each other to be engaged and fixed. At this time, the first positioning piece 48a is positioned on the most front side in the first positioning hole 40c. In addition, with respect to the front-rear direction, the second positioning piece 50b is engaged with and fixed to the second positioning hole 40f at the center. Further, in this state, the small protrusion 46 is engaged with the stop piece 38d, and thus the frame unit 33 does not escape upward (refer to also FIG. 12).

In order to disassemble the base plate 34 and the frame unit 33, first, the base plate 34 and the frame unit 33 are removed from the frame body 28 to be in a state shown in FIG. 10. In addition, the sensor board 24 is removed from the outer frame 30 as necessary. Then, the bent portion 50*a* and the second positioning piece 50*b* that are exposed from the second positioning hole 40*f* at the position indicated by the arrow in FIG. 10 are pushed in with a pen tip or the like. Note that depending on the specifications, the bent portion 50*a* and the second positioning piece 50*b* may be pulled out using a tool from the opposite side surface. Since the plate spring 50 has an elongated shape and has spring properties, the second positioning piece 50*b* can be elastically retreat, and is escaped and released from the second positioning hole 40*f*, and thus the base plate 34 and the frame unit 33 are relatively moved in the front-rear direction.

Figure 14:
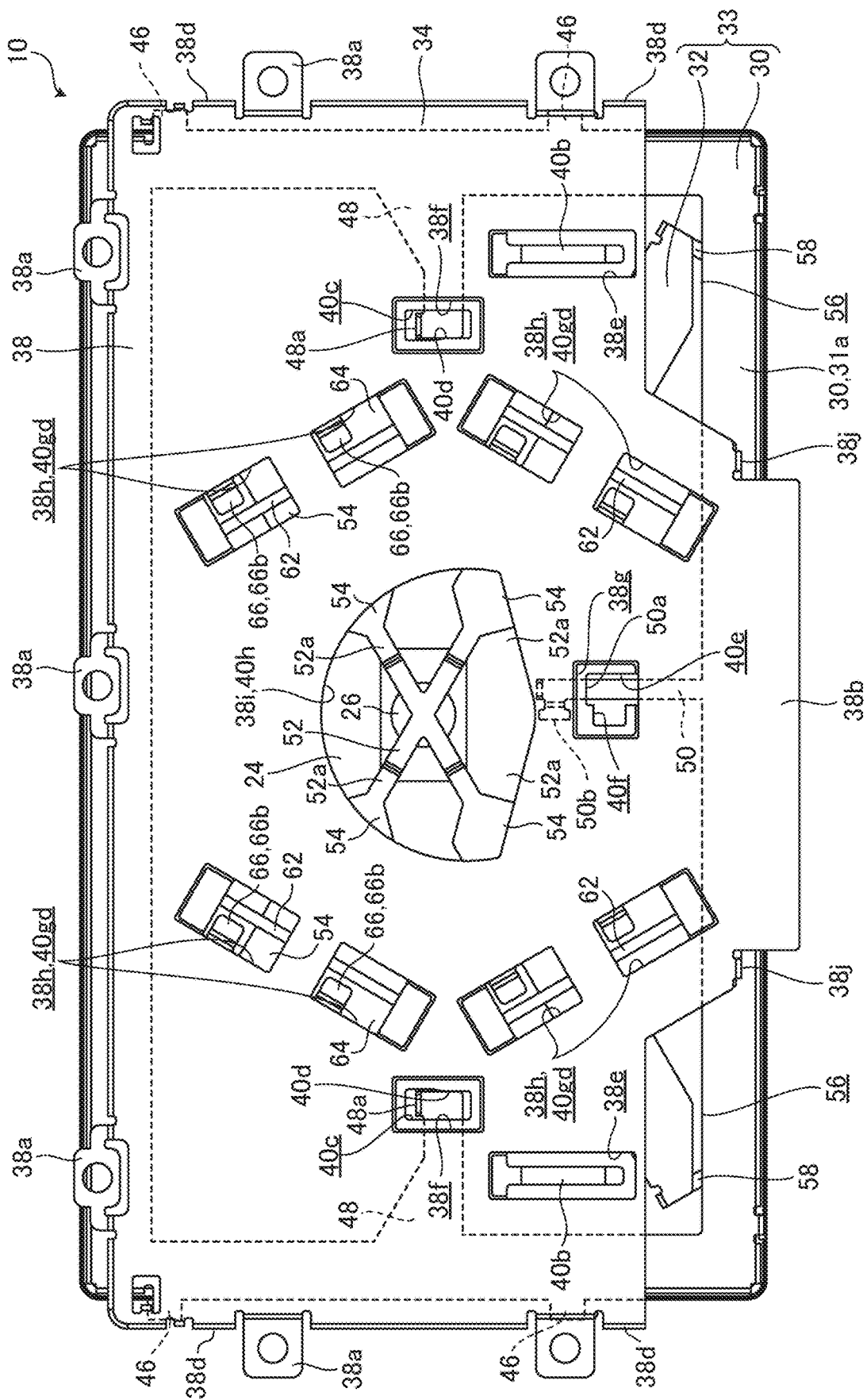
FIG. 14 is a bottom view of the touch pad in a state where the base plate and the frame unit are relatively moved in the front-rear direction.
Figure 15:
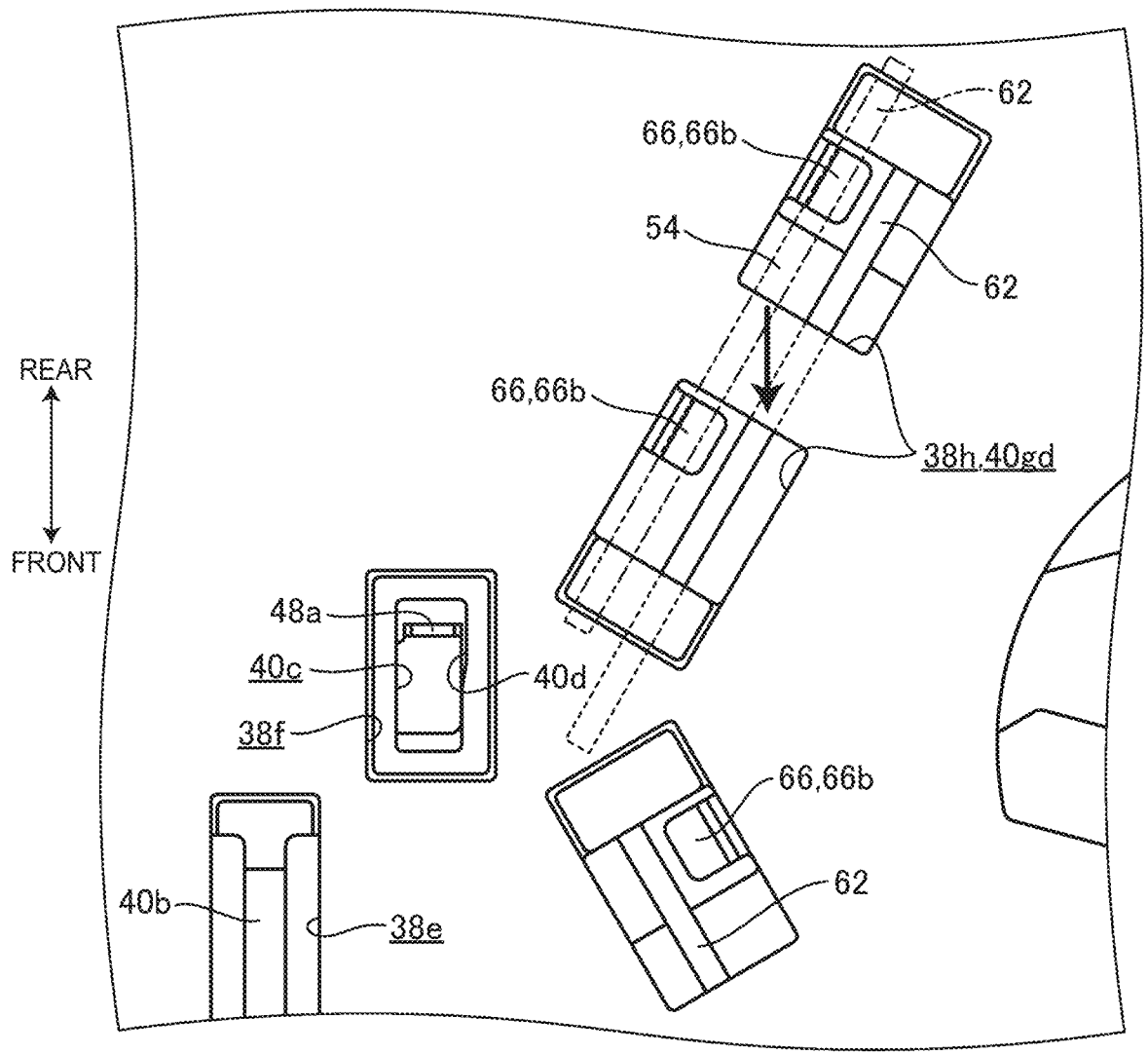
FIG. 15 is a partially enlarged view of FIG. 14.

FIG. 14 is a bottom view of the touch pad 10 in a state where the base plate 34 and the frame unit 33 are relatively moved in the front-rear direction. FIG. 15 is a partially enlarged view of FIG. 14. When the frame unit 33 is moved rearward relative to the base plate 34, the second positioning piece 50*b* slides on the thick wall portion 40*k* (refer to FIG. 7) and is moved between the second positioning hole 40*f* and the escape hole 40*h*. The four small protrusions 46 escape rearward from the stop piece 38*d*, and the base plate 34 and the frame unit 33 can be separated from each other up and down. At this time, the first positioning piece 48*a* is moved to the vicinity of the rear end of the first positioning hole 40*c*, and a slight gap is formed between the first positioning piece 48*a* and the positioning wall 40*d* (refer to FIG. 15), and thus the frictional force is hardly generated in the separation between the base plate 34 and the frame unit 33.

Although the four shafts 62 have different orientations in pairs, the shaft support pieces 66 that support the shafts 62 have different orientations between the arm portion 54A and the arm portion 54B (refer to FIG. 4) as described above, and in the arm portion 54A, the horizontal plate 66*b* is oriented from the vertical plate 66*a* toward the corner portion of the outer frame 30, whereas in the arm portion 54B, the horizontal plate 66*b* is oriented from the vertical plate 66*a* toward the center portion of the outer frame 30. That is, each shaft support piece 66 is open in the same direction (in this case, the forward direction), the shaft 62 can be extracted rearward when the frame unit 33 is moved rearward relative to the base plate 34, and the shaft 62 moves along the arrow from the position shown by the virtual line in FIG. 15. The base plate 34 and the frame unit 33 may be assembled in a reverse procedure, and in this case, the shaft 62 is inserted from the rear between the upper surface of the horizontal plate 66*b* and the lower surface of the arm portion 54.

The present invention is not limited to the above-described embodiments, and there is no doubt that the present invention can be freely changed without departing from the gist of the present invention.

DESCRIPTION OF SYMBOLS 10 touch pad
12 electronic apparatus
14 main body chassis
16 keyboard
22 pointing stick
24 sensor board
25 button region
26 switch
28 frame body
30 outer frame
31*a* lower layer plate
31*b* upper layer plate
32 inner frame
33 frame unit
34 base plate (base)
38 metal plate
38*d* stop piece
40 resin plate
40*b* resin plate spring (elastic body)
40*c* first positioning hole
40*d* positioning wall
40*f* second positioning hole
40*g* bearing portion
44 slide fitting portion
46 small protrusion
48*a* first positioning piece
50 plate spring
50*b* second positioning piece
52 central portion
52*a* extension portion
52*b* step portion
54, 54A, 54B arm portion
56 gap
58 side protruding portion
60 shaft support portion
62 shaft
64 shoulder portion
66 shaft support piece
66*a* vertical plate
66*b* horizontal plate
68 elastic connecting portion

What is claimed is:

1. A touch pad on which a pointing operation is performed by a hand, comprising:
a sensor board configured to recognize a touch position by the hand;
an outer frame configured to be fixed to the sensor board;
a cross-shaped inner frame configured to be disposed on an inner side of the outer frame, in which a first end of each of four arm portions are connected and a second end of each of the four arm portions extend toward four corresponding locations of the outer frame; and
a switch configured to be provided between the first ends of the four arm portions and the sensor board, wherein
in each of the four arm portions, a shaft support portion at an intermediate portion of the corresponding arm portion is configured to be capable of being inclined, in a pitch direction of the corresponding arm portion, about a shaft of the corresponding arm portion, where a longitudinal axis of the shaft is disposed orthogonal to an extension direction of the corresponding arm portion,
in each of the four arm portions, the shaft support portion includes a set of shaft support pieces that:
are integrally connected to the intermediate portion of the corresponding arm portion, protrude along the extension direction of the corresponding arm portion, and
are bent in two stages to sandwich the shaft between the corresponding arm portion and the set of shaft support pieces,
the second ends of the four arm portions are displaced in a lifting/lowering direction together with the sensor board, and are supported to be slidable in a front-rear direction and a left-right direction that are parallel to a surface of the sensor board, and
as the sensor board is pushed down in the lifting/lowering direction by the hand, the four arm portions are displaced relative to the outer frame while the second ends of the four arm portions are pushed down in the lifting/lowering direction, the four arm portions are inclined with respect to their corresponding shaft support portions in their corresponding pitch directions, and the first ends of the four arm portions are pushed up in the lifting/lowering direction to perform a pressing operation with respect to the switch.

2. The touch pad according to claim 1, wherein the shaft support portion of each arm portion is configured to be slidable in the extension direction of the corresponding arm portion.

3. The touch pad according to claim 2, wherein in each of the four arm portions, the shaft is removable from the corresponding set of shaft support pieces by sliding along the front-rear direction.

4. The touch pad according to claim 3, wherein the inner frame or the outer frame has a first positioning piece that protrudes toward a base, the base has a first positioning portion that is engaged with the first positioning piece to perform positioning in a direction orthogonal to the front-rear direction, and when the inner frame and the outer frame are relatively shifted in the front-rear direction, a length of the first positioning portion in the front-rear direction is set such that the first positioning piece is movable until, in each of the four arm portions, the shaft escapes from a support range of the set of shaft support pieces.

5. The touch pad according to claim 3, wherein the inner frame or the outer frame has a second positioning piece that protrudes toward a base and is capable of elastically retreating in the lifting/lowering direction, the base has a second positioning portion that is engaged with the second positioning piece to perform positioning in the front-rear direction, and the second positioning piece is elastically retreated from the second positioning portion and released by a pushing or pulling operation.

6. The touch pad according to claim 1, wherein a side protruding portion is provided at the second ends of each of the four arm portions, slide fitting portions into which the side protruding portions of the four arm portions are inserted are formed by at least one of the outer frame and the sensor board, and the side protruding portions are fitted into the slide fitting portions without a gap in the lifting/lowering direction of the sensor board and are slidable in the front-rear direction and the left-right direction.

7. The touch pad according to claim 6, wherein the inner frame and the outer frame are formed of a metal plate material, the side protruding portion of each of the four arm portions is formed by folding a part of the corresponding arm portion toward the sensor board, the outer frame has a two-layer structure including a folded lower plate layer and an upper plate layer, and the slide fitting portions are formed at parts of the upper plate layer that are cut out between the lower plate layer and the sensor board.

8. The touch pad according to claim 1, wherein each of the four arm portions is configured to be elastically bendable between the corresponding first end that presses the switch and the corresponding second end.

9. The touch pad according to claim 1, wherein the inner frame and the outer frame are connected to each other by an elastic connecting portion on a same plane that does not hinder relative movement of the inner frame and the outer frame.

* * * * *